F. J. SCHISLER.
JOURNAL BEARING.
APPLICATION FILED MAY 6, 1912.
1,141,835.
Patented June 1, 1915.
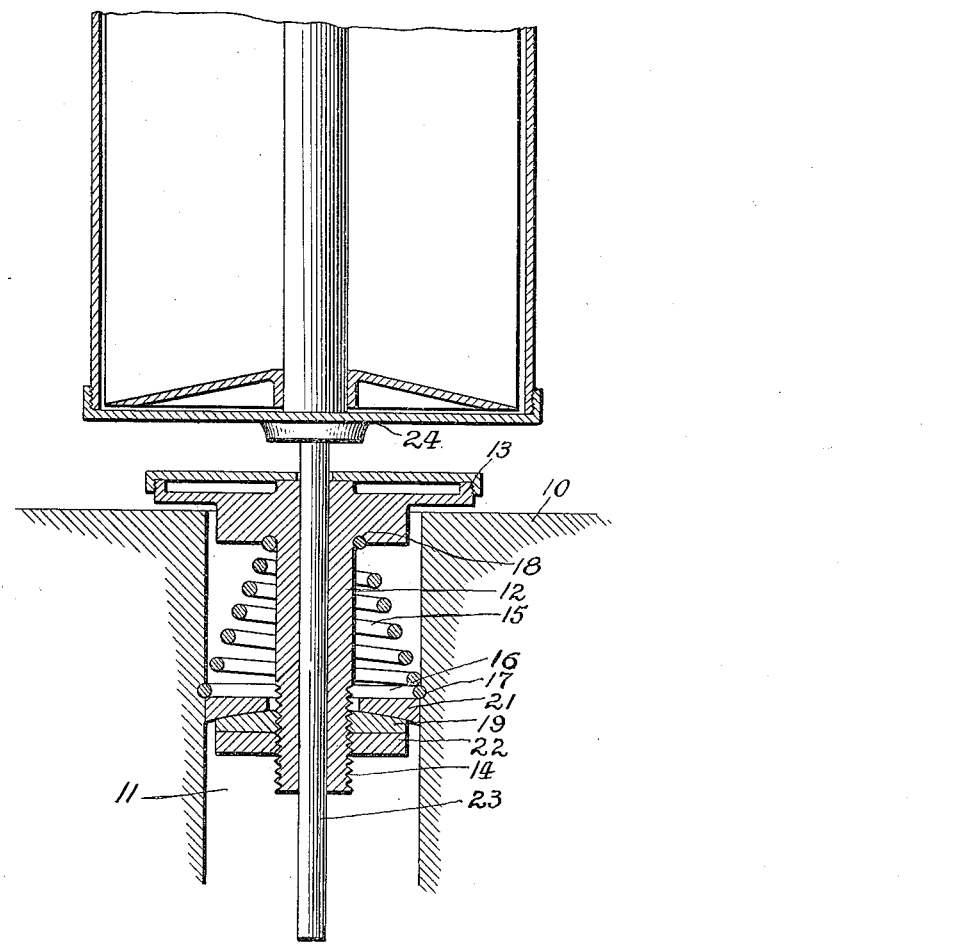
WITNESSES
INVENTOR
Frank J. Schisler
By Hodges & Hodges
Attorney

UNITED STATES PATENT OFFICE.

FRANK J. SCHISLER, OF WINTHROP, MINNESOTA.

JOURNAL-BEARING.

1,141,835.   Specification of Letters Patent.   Patented June 1, 1915.

Application filed May 6, 1912. Serial No. 695,442.

*To all whom it may concern:*

Be it known that I, FRANK J. SCHISLER, a citizen of the United States, residing at Winthrop, in the county of Sibley and State of Minnesota, have invented new and useful Improvements in Journal-Bearings, of which the following is a specification.

This invention contemplates certain new and useful improvements in journal bearings, and relates more particularly to that class of bearings utilized for supporting the shafts or spindles which are intended to rotate at a high speed, such for instance as centrifugal separators, or the like.

In the use of rapidly rotating elements, such as centrifugal separators, it is necessary to provide a bearing which will readily yield so as to prevent binding of the spindle or shaft in the bearing, particularly in starting the operation of the separator when the bowl is necessarily rotating at its low speed.

One of the objects of my invention is to meet the foregoing condition by providing a resiliently supported bearing which will yield in any direction, while properly supporting the bearing, so as to prevent binding of the spindle at any time.

A further object is to provide an improved bearing which may be readily and securely placed in position, and which may be easily removed if occasion should require.

A further object is to provide means for adjusting the bearing.

The invention will be hereinafter fully set forth and particularly pointed out in the claims.

In the accompanying drawing the figure is a longitudinal sectional view of the bearing embodying my invention.

Referring to the drawing, 10 designates the upper portion of the frame of a centrifugal separator, or the like, the same being provided with the bore 11. The bearing sleeve 12 is provided with an annular flange 13 at its upper end and a threaded portion 14 at its lower end, said sleeves being supported within the bore 11 by means of a coiled spring 15 of conical form, the lowermost convolution 16 of which engages an annular notch 17 formed in the wall of the bore 11. The topmost convolution of the spring 15 fits within an annular seat 18 formed in the underside of the flange 13.

Adjustably mounted upon the threaded portion 14 is a nut 19 having an upper spherical surface which engages a complemental recess in the under side of a centering washer 21 which engages the convolution 16, said washer being of a diameter approximately equal to the diameter of the bore 11.

A jam nut 22 serves to lock the nut 19 in any adjusted position on the sleeve 12.

The spindle 23 which supports the bowl 24 extends through the bore of the sleeve 12.

In operation the nut 19 is adjusted to effect the desired tension upon the spring 15 through the washer 21, and the bearing is then inserted into the bore 11 until the convolution 16 springs into the notch 17, thereby locking the bearing in position. It will be observed that the tension of spring 15 and its relation to the other parts is such that the bearing sleeve 12 is normally held in a central position within the bore 11, but said bearing sleeve is free to rock in any direction through the engagement between the spherical portion of nut 19 and the complemental recess in washer 21. In this manner the bearing is resiliently supported but free to yield in any direction so as to prevent binding of the spindle at all times. It will also be observed that the notch 17 will firmly support the bearing through the spring 15, against accidental displacement, and yet if it is desired to remove the bearing for any purpose the same can be done by exerting sufficient pull to overcome the engagement between the spring and the recess.

Having thus explained the nature of my invention and described an operative manner of constructing and using the same, although without attempting to set forth all of the forms in which it may be made, or all of the forms of its use, what I claim is:—

1. A bearing of the character described comprising a bearing sleeve, a flexible centering device comprising a spring having one end rigidly supported, the other end of said spring supporting said sleeve and being free to move laterally, and means carried by the bearing sleeve for varying the tension on said spring, said tension-varying means also including means for effecting a rocking adjustment of said centering device.

2. A bearing of the character described comprising a bearing sleeve, a centering spring having one end in engagement with said sleeve and free to move laterally, means for rigidly supporting the other end of said spring, a centering washer engaging said spring, means carried by said bearing sleeve for providing a universal connection between the sleeve and said centering washer, said universal connection including means for adjusting the tension of said spring.

3. A bearing of the character described comprising a bearing sleeve, a centering spring for supporting said bearing sleeve, a centering washer engaging said spring, and a nut working on said sleeve and engaging said washer to vary the tension on said spring, said nut and washer having complemental faces forming a universal bearing.

4. A bearing of the character described comprising a bearing sleeve, a conical bearing spring having one end engaging said sleeve, a centering washer engaging the other end of said spring and a nut working on said sleeve and engaging said washer to vary the tension on said spring, said nut and washer having complemental faces forming a universal bearing.

5. A bearing of the character described comprising a bearing sleeve having a flange at one end, a centering spring having one end engaging said flange, a centering washer engaging the other end of said spring, and a nut working on said sleeve and engaging said washer to vary the tension on said spring, said nut and washer having complemental faces forming a universal bearing.

6. A bearing of the character described comprising a bearing sleeve having a flange at one end, a conical spring having one end engaging said flange, a centering washer engaging the other end of said spring, and a nut working on said sleeve and engaging said washer to vary the tension on said spring, said nut and washer having complemental faces forming a universal bearing.

In testimony whereof I have hereunto set my hand in presence of two subscribing witnesses.

FRANK J. SCHISLER.

Witnesses:
CHAS. W. QUANOT,
C. E. LARSON.

Copies of this patent may be obtained for five cents each, by addressing the "Commissioner of Patents Washington, D. C."